United States Patent
Finkenzeller et al.

(10) Patent No.: US 11,023,600 B2
(45) Date of Patent: Jun. 1, 2021

(54) PROTECTION AGAINST A RELAY ATTACK

(71) Applicant: GIESECKE+DEVRIENT MOBILE SECURITY GMBH, Munich (DE)

(72) Inventors: Klaus Finkenzeller, Unterföhring (DE); Volker Stöhr, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 80 days.

(21) Appl. No.: 16/483,505

(22) PCT Filed: Feb. 5, 2018

(86) PCT No.: PCT/EP2018/000047
§ 371 (c)(1),
(2) Date: Aug. 5, 2019

(87) PCT Pub. No.: WO2018/145808
PCT Pub. Date: Aug. 16, 2018

(65) Prior Publication Data
US 2021/0019433 A1    Jan. 21, 2021

(30) Foreign Application Priority Data
Feb. 7, 2017   (DE) .................... 10 2017 001 092.7

(51) Int. Cl.
*G06F 21/62*   (2013.01)
*G06F 21/56*   (2013.01)
(Continued)

(52) U.S. Cl.
CPC .............. *G06F 21/62* (2013.01); *G06F 21/56* (2013.01); *H04W 12/121* (2021.01);
(Continued)

(58) Field of Classification Search
CPC .......... G06F 21/62; G06F 21/56; G06F 21/35; H04W 12/00; H04W 12/12; H04W 12/121; H04W 12/122
See application file for complete search history.

(56) References Cited

U.S. PATENT DOCUMENTS 6,269,246 B1 *   7/2001   Rao ..................... G01S 5/0252
                                                              455/186.1
2005/0037733 A1 *  2/2005  Coleman ............. H04L 63/1416
                                                              455/411
(Continued)

FOREIGN PATENT DOCUMENTS

DE   102012007286 A1   10/2013
DE   102013015478 A1 *  3/2015 ............. B60R 25/00
DE   102013015478 A1    3/2015

OTHER PUBLICATIONS

Chick et al. ("Direction finding with mutually orthogonal antennas", Antennas and Propogation, IEEE (Year: 2011).*
(Continued)

Primary Examiner — Jayesh M Jhaveri
(74) Attorney, Agent, or Firm — Workman Nydegger

(57) ABSTRACT

A method for protection against a relay attack on a system is composed of at least a first and a second communication device. Data are transmitted wirelessly between the first and the second communication device. The first communication device ascertains a first spectrum of all wirelessly transmitted signals to be received at the location of the first communication device within a frequency band. The second communication device likewise ascertains a second spectrum of all wirelessly transmitted signals to be received at the location of the second communication device within the frequency band. The frequency band is limited by a minimum and a maximum frequency. The second communication device transmits the second spectrum to the first com- (Continued)

munication device. The first communication device compares the first spectrum with the second spectrum in order to ascertain whether the second communication device is located at the location of the first communication device.

8 Claims, 2 Drawing Sheets

(51) Int. Cl.
  *G06F 21/35* (2013.01)
  *H04W 12/12* (2021.01)
  *H04W 12/121* (2021.01)
  *H04W 12/122* (2021.01)
(52) U.S. Cl.
  CPC .............. *G06F 21/35* (2013.01); *H04W 12/12* (2013.01); *H04W 12/122* (2021.01)

(56) References Cited

U.S. PATENT DOCUMENTS

| | | | | |
|---|---|---|---|---|
| 2005/0222933 | A1* | 10/2005 | Wesby | H04W 4/50 705/36 R |
| 2007/0217371 | A1* | 9/2007 | Sinha | H04L 63/1408 370/338 |
| 2014/0169564 | A1* | 6/2014 | Gautama | G07C 9/00309 380/270 |
| 2015/0222658 | A1* | 8/2015 | Kim | H04L 63/1466 726/22 |
| 2018/0056939 | A1* | 3/2018 | van Roermund | B60R 25/24 |

OTHER PUBLICATIONS

German Search Report from DE Application No. DE 102017001092. 17, dated Nov. 14, 2017.

International Search Report from PCT Application No. PCT/EP2018/000047, dated Apr. 16, 2018.

Chick et al., "Direction Finding With Mutually Orthogonal Antennas," 2011 IEEE International Symposium on Antennas and Propagation, Jul. 3-8, 2011, p. 2853-2856.

Afgani et al., "Speed Estimation Using Relative Radio Frequency Signature Matching," 2007 IEEE 66th Vehicular Technology Conference, Sep. 1, 2007, pg. 1970-1974.

Truong et al., "Comparing and Fusing Different Sensor Modalities for Relay Attack Resistance in Zero-Interaction Authentication," 2014 IEEE International Conference on Pervasive Computing and Communications, PerCom, Mar. 24-28, 2014, p. 163-171.

* cited by examiner

PROTECTION AGAINST A RELAY ATTACK

BACKGROUND

The present invention is directed to a method for protection against a relay attack on a system composed of at least a first and a second communication device, wherein data are transmitted wirelessly between the first and the second communication device.

From the state of the art, so-called "clicker" and keyless go systems are known as access system to a motor vehicle. In the case of the "clickers", after pressing a key, a rolling code is usually produced and transmitted to the motor vehicle at a frequency of 433.975 MHz or 867 MHz in the UHF band. In the keyless go systems, there is additionally located an RFID reader in the motor vehicle and a tag in the vehicle key, so that a door can be opened when approaching the motor vehicle. In these methods, it can further be detected whether the vehicle key is located inside or outside of the motor vehicle in order, for example, to be able to lock or release the ignition of the motor vehicle accordingly.

In general, in a keyless go system, a combination is employed composed of an RFID signal at 125 kHz, which is produced by the motor vehicle and serves as a so-called wake-up signal, and a UHF transmitter, which is located in the vehicle key and after receiving the wake-up signal sends a response to the motor vehicle.

Further, so-called wideband RF monitoring receivers are known from the state of the art, with which a large bandwidth can be spectrally monitored. It is also known according to the prior art to employ such monitoring receivers for a long-range localization of mobile receivers, for example trucks. By ascertaining, for example, the amplitude and frequency of signals of the radio and DVB-T transmitters to be received, as well as those of the GSM cells to be received, it can be ascertained exactly whether the receiver is located, for example, in the greater Munich area, Nuremberg or, for instance, Frankfurt. In addition, the transmitter's signal changes as the receiver changes location. This effect is all the more pronounced when, in addition to the localization of a particular receiver, additionally also short-range transmitters, for example for WLAN, are considered. For the receiver to be able to determine whether its position has changed, the receiver takes a number of time-shifted measurements.

A problem with "clicker" and keyless go systems is that in these systems the data transmitted between the motor vehicle and the vehicle key can be read remotely without authorization through a relay attack, and thus the corresponding motor vehicle can be opened and started without authorization.

SUMMARY

It is thus an object of the present invention to supply a solution to the problems described above.

To solve the problem, the invention discloses a method for protection against a relay attack on a system composed of at least a first and a second communication device, wherein data are transmitted wirelessly between the first and the second communication device. According to the invention, the first communication device ascertains a first spectrum of all wirelessly transmitted signals to be received at the location of the first communication device within a frequency band. The second communication device likewise ascertains a second spectrum of all wirelessly transmitted signals to be received at the location of the second communication device within the frequency band. The frequency band itself is limited by a minimum and a maximum frequency, wherein the minimum and the maximum frequency are to be suitably defined in dependence on the application, wherein also several frequency bands can be employed. After ascertaining the second spectrum, the second communication device transmits the second spectrum to the first communication device. The first communication device compares the first spectrum with the second spectrum to determine whether the second communication device is at the location of the first communication device. When it is determined upon comparing the first with the second spectrum that the two spectra match, then it is to be assumed that the first and the second communication device are located in a common location and thus there is no relay attack.

According to an advantageous embodiment example of the invention, the first and the second spectrum are ascertained simultaneously or at different times. The ascertainment of the two spectra at the same time has the advantage that the two spectra can be compared immediately. The ascertainment at different times has the advantage that an attacker does not know the time when he should imitate a spectrum from the outside, and this measure thus increases the protection against attacks. The first communication device preferably signals to the second communication device when the second communication device should start or finish the ascertainment of the spectrum to be received.

According to a further advantageous embodiment example of the invention, the first and the second spectrum are ascertained constantly or only at certain times. The constant capturing of the spectra has the advantage that a large amount of data is captured and thus a greater accuracy is achieved with reference to ascertaining the location. The advantage of ascertaining the spectra only at certain times has the advantage that the effort of data processing can be kept small and that potential attackers do not know when the spectra are ascertained, so that there is increased protection against attackers attempting to imitate the spectrum to be received at the location of the first or the second communication device. Further, the ascertainment of the spectra only at certain times can be carried out quickly.

According to a further advantageous embodiment example of the invention, in addition to the spectra to be received at the respective location of the first and the second communication device, the first communication device itself emits a signal which is received both by the first communication device itself and by the second communication device. The advantage is that this signal is emitted only by the first communication device and this is thus a unique and easily recognizable feature in the respective spectra to be ascertained of the first and the second communication device. The signal is within the above-mentioned frequency band to be suitably defined. Within the frequency band, the signal can be emitted at one frequency or at different frequencies. The first communication device preferably sends at least one signal while the first and the second communication device each ascertain a spectrum of the signals to be received.

According to a further advantageous embodiment example of the invention, the first communication device notifies the second communication device for which frequencies a signal amplitude is to be ascertained in each case. This has the advantage that the spectra to be ascertained can be limited to specific frequencies and thus reduces the effort for evaluation and comparison of the spectra, but also increases the protection against attackers, since an attacker does not know the frequencies to be ascertained.

According to a further advantageous embodiment example of the invention, the data transmission between the first and the second communication device is encrypted. This has the advantage that even if an attacker should receive the data transmission, he cannot decrypt the content, which thus is useless for him.

According to a further advantageous embodiment example of the invention, the first and the second communication device each have three antennas, wherein the three antennas are respectively arranged at an angle, for example at right angles, to each other. This has the advantage that, by measuring an amplitude of a received signal and possibly a phase position of the received signal in all three spatial directions, an absolute value of the amplitude of the signal can be ascertained independently of an alignment of the first and the second communication device. Consequently, a better comparability of the signals measured by the first and the second communication device is possible.

According to a further advantageous embodiment example of the invention, a spatial angle between the individual signals to be received is ascertained. This has the advantage that besides the frequency and the amplitude of each signal ascertained in the spectrum in addition a spatial angle between the individual signals is ascertained by means of the three antennas mentioned above, which, for example, are respectively arranged at right angles to each other, which further increases the protection against attackers.

According to a further advantageous embodiment example, the first communication device is a motor vehicle and the second communication device is a vehicle key. Alternatively, the first communication device is the vehicle key and the second communication device is the motor vehicle. This has the advantage that the invention can be used in the automotive sector for protection against relay attacks. However, the invention is not limited to the automotive sector, but can be used, for example, also in the terminal sector, wherein the first communication device is a terminal, for example a bank terminal, and the second communication device is a portable data carrier, for example a chip card or a wearable.

BRIEF DESCRIPTION OF THE DRAWINGS

Further advantageous embodiments are explained in more detail with reference to the attached figures.

The figures are described as follows.

DETAILED DESCRIPTION OF VARIOUS EMBODIMENTS

Figure 1:
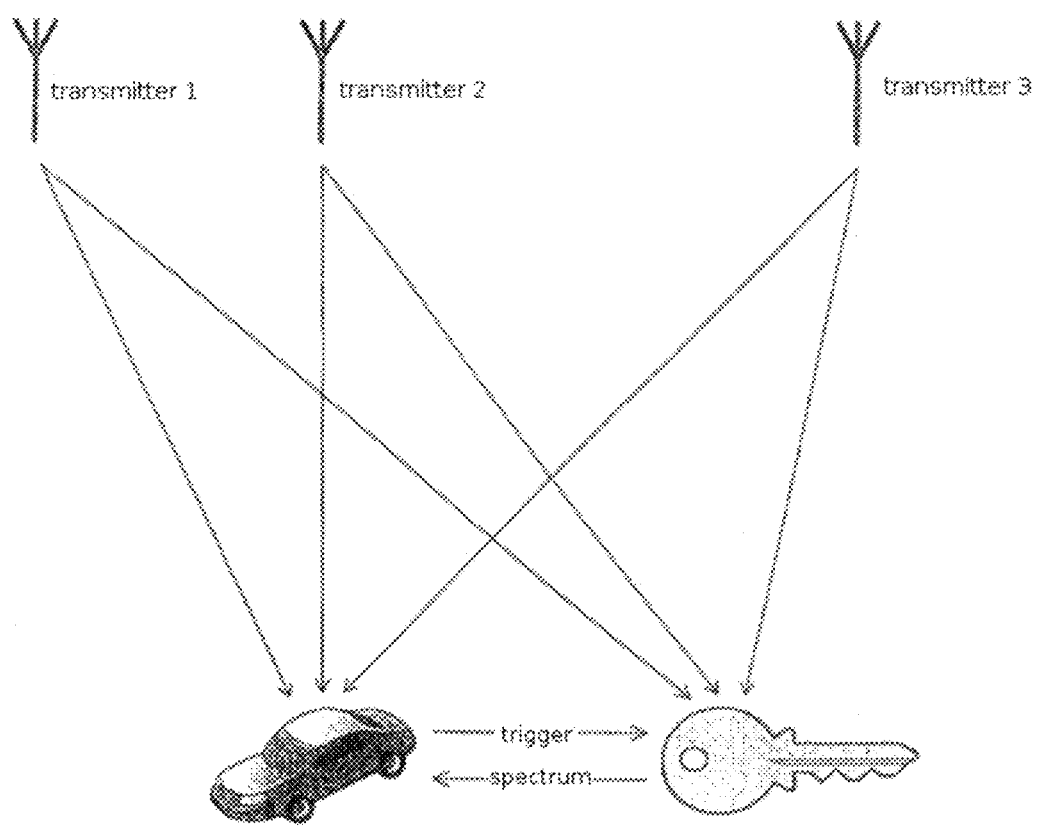
FIG. 1: a first embodiment example of the invention, in which a motor vehicle and a vehicle key at their respective location ascertain a spectrum of signals to be received from three different transmitters and the spectra are subsequently compared by the motor vehicle to determine whether the vehicle key is located at the location of the motor vehicle.

FIG. 1 shows a first embodiment example of the invention, in which a motor vehicle 2 as the first communication device and a vehicle key 4 as the second communication device at their respective location ascertain a spectrum of signals to be received of a transmitter 1, transmitter 2 and transmitter 3. The motor vehicle 2 sends a trigger signal "trigger" to the vehicle key 4 in order to signal to the vehicle key 4 that a spectrum is to be ascertained. As soon as the vehicle key 4 has ascertained the spectrum, the spectrum is transmitted to the motor vehicle 2 by means of a "spectrum" response. The motor vehicle 2 compares the two spectra to determine whether the vehicle key 4 is located at the location of the motor vehicle 2.

The motor vehicle 2 and the vehicle key 4 each have a transmitter and a receiver, which are not shown for reasons of clarity, to exchange data wirelessly. It is essential for the invention that the motor vehicle 2 and the vehicle key 4 additionally have a receiver which, for reasons of clarity, is not shown, in order to receive at their respective location within a frequency band to be defined signals wirelessly transmitted by transmitters, which are represented in FIG. 1 by the transmitters 1 to 3, and to generate a spectrum from each thereof. The motor vehicle 2 requests, for example, the generation of the spectrum in the vehicle key 4 by means of the trigger signal represented, and subsequently receives the spectrum generated by the vehicle key 4 in order to compare it with the spectrum ascertained by itself. When both spectra match, then it is to be assumed that there is no relay attack, so that, for example, the doors of the motor vehicle 2 can be unlocked or the engine can be started. The additional receiver in the motor vehicle 2 and in the vehicle key 4 has, for example, a frequency band of 100 MHz to 2.3 GHz as its reception range. A minimum and a maximum frequency which limit the frequency band are to be suitably defined.

In order to protect the data exchange between the motor vehicle 2 and the vehicle key 4 against unauthorized access, the data exchange is encrypted by means of a suitable cryptographic method.

In the comparison of the spectra of the motor vehicle 2 and the vehicle key 4, an algorithm is used which is able to compare the spectra and recognizes, on the basis of differences in the spectrum, whether the vehicle key 4 is located sufficiently closely to the location of the motor vehicle 2. Depending on the application, it is to be suitably defined up to what limit a difference is still acceptable for the vehicle key 4 still to be considered located at the location of the motor vehicle 2, or vice versa, starting from what difference a relay attack is assumed.

At the location of the motor vehicle 2 and the vehicle key 4, the signals of the three represented transmitters, i.e. transmitter 1, transmitter 2 and transmitter 3, which emit, for example, mobile-communication, WLAN and radio signals, can be received with corresponding amplitudes. The amplitude of the received signals depends in particular on the transmission power, the transmission frequency with respect to free space attenuation, the distance of the transmitter and the immediate environment, for example an underground car park, of the motor vehicle 2 and the vehicle key 4. In addition, signal reflections on the path between the transmitter and the motor vehicle 2 or the car key 4, which can lead to cancellation or amplification locally and on a small scale, affect the received signals. The amplitudes of the individual received signals can additionally vary over time.

In order to determine whether the vehicle key 4 is located in the vicinity of the motor vehicle 2, the motor vehicle 2 and the vehicle key 4 measure the amplitude of the signals to be received simultaneously or at different times via the same frequency band to be suitably defined in order to generate a spectrum from each thereof. Immediately after the generation of the spectrum, the vehicle key 4 transmits the spectrum to the motor vehicle 2, where the two spectra measured by the motor vehicle 2 and the vehicle key 4 are compared with one another. When the motor vehicle 2 and the vehicle key 4 are located in the immediate vicinity of one another, both spectra for the signals of the same frequency will have a similar amplitude. According to the invention, it is provided that a suitable algorithm ascertains the match of both spectra and, when the match is sufficient, for example releases the access to the vehicle. It is further possible that tolerable deviations in frequency and amplitude are suitably predetermined.

As the amplitudes of the signals can vary over time, the motor vehicle 2 and the vehicle key 4 ensure that the signal measurements are preferably carried out at the same time. For increased protection against an unauthorized attack alternatively also a measurement at different times is possible.

It is further possible that on the motor vehicle 2 there is additionally located a transmitter, which is not shown for reasons of clarity, which emits a signal at any desired frequency within the frequency band of the motor vehicle 2 and the vehicle key 4 to be received and to be suitably defined. The transmitter can also send several signals at different frequencies. Ideally, several frequencies are selected at random and the emission is limited to the period of ascertainment of the spectra. Thus, in addition to the signals from the transmitters 1, 2 and 3 from the environment, the motor vehicle 2 and the vehicle key 4 also receive the signal emitted by the transmitter of the motor vehicle 2. In a spectrum of the vehicle key 4 then the frequency of the transmitter of the motor vehicle 2 can then be easily searched, in order to be able to easily determine whether the vehicle key can receive the signal at all and, if so, with what amplitude.

When comparing the amplitude of the signals received by the motor vehicle 2 with the amplitude of signals received by the vehicle key 4, it must be taken into account that the signals emitted by the motor vehicle 2 are more strongly received by the motor vehicle 2 itself than by the vehicle key 4, due to the small distance between transmitter and receiver.

In a further embodiment example of the invention, the motor vehicle 2 decides for which frequencies the signal amplitudes are to be measured and communicates this to the vehicle key 4. To prepare for this decision, the motor vehicle 2 previously searches the complete spectrum to be received for signals. The motor vehicle 2 subsequently selects frequencies with signals above a specific amplitude and frequencies below the specific amplitude. After the selection, both the motor vehicle 2 and the vehicle key 4 then only measure the amplitudes at the frequencies selected by the motor vehicle 2, which on the one hand goes fast, and on the other hand also represents high protection against attackers, since the attacker does not know the selected frequencies.

In a further embodiment example of the invention, it is provided that the vehicle key 4 and the motor vehicle 2 receive signals at their respective location, demodulate and/or decode them in order to establish the identity of the respective received transmitter. Such an identity can, for example, be the SSID of a WLAN network, the RDS transmitter identification of VHF radio transmitters or the identification of a GSM radio cell. When comparing the spectra ascertained by the motor vehicle 2 and vehicle key 4, it is thus possible to check whether the signals were received from the same transmitters. In particular, the SSID of a WLAN allows the delimitation over short distances.

The signal amplitude that a receiver generally establishes depends on the orientation, i.e. propagation direction and polarization, of the signal and on the orientation of the receiving antenna with reference to the signal. Since the orientations of the various signals and of the receivers in the motor vehicle 2 and the vehicle key 4 are indefinite and usually are different from each other, it is proposed in a development of the invention that the receiver for receiving the frequency band to be defined in the motor vehicle 2 and in the vehicle key 4 has three antennas, which are respectively arranged at an angle, for example at right angles, to each other. By the measurement of the signal amplitude and possibly a phase position of the signal in all three spatial directions, the absolute value of the signal amplitude can be established independently of the alignment of the motor vehicle 2 and/or of the vehicle key 4. Thus, a better comparability of the signal amplitudes measured by the motor vehicle 2 and the vehicle key 4 is given.

Figure 2:
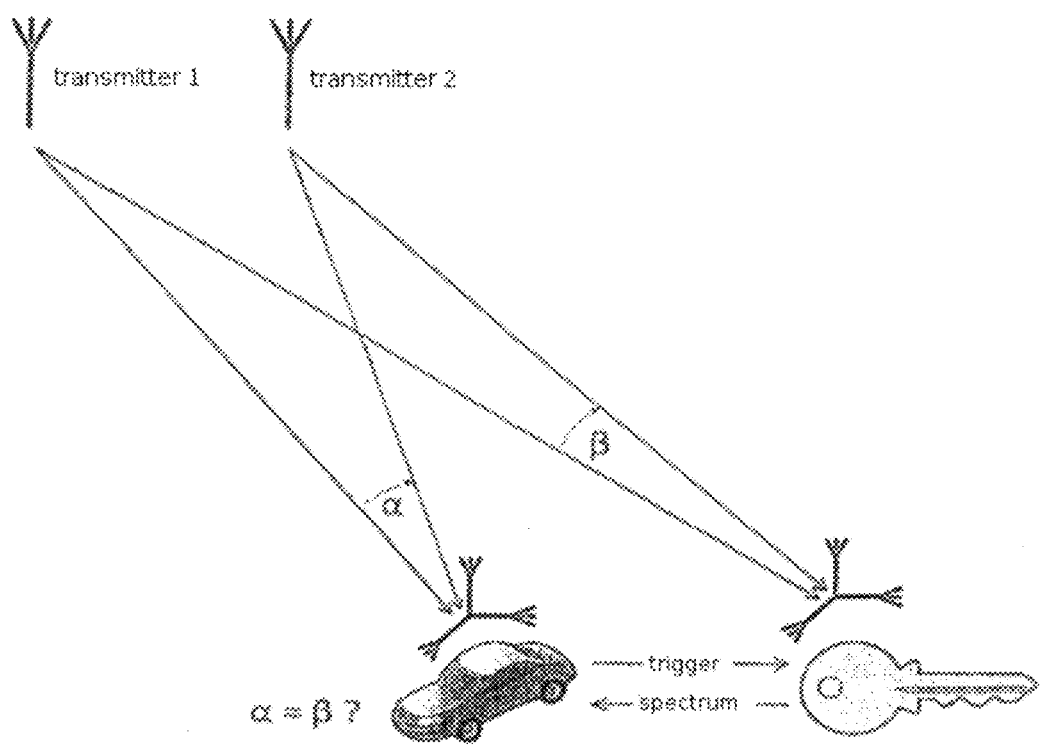
FIG. 2: a second embodiment example of the invention, in which the motor vehicle and the vehicle key each have three antennas, which, for example, are arranged offset respectively by 90 degrees, to establish a spatial angle between the received signals from two transmitters.

As an additional development of the invention, in such an antenna arrangement it is possible for the receiver to ascertain the angles between the received signals for the frequency band of the motor vehicle 2 and the vehicle key 4 to be defined. An expanded comparison algorithm then additionally compares the angles established of the motor vehicle 2 and those established of the vehicle key 4. This embodiment example is represented in FIG. 2. For reasons of clarity, only the transmitters 1 and 2 were represented here, whose signals are received respectively by the motor vehicle 2 and the vehicle key 4. Between the signals an angle ALPHA and an angle BETA can be ascertained. An attacker who carries out a relay attack would not only have to forward a communication between the motor vehicle 2 and the vehicle key 4 over a greater distance, but would also have to measure the signals to be received in the vicinity of motor vehicle 2 and/or vehicle key 4 and emulate these signals at the respective other location. It is much more difficult for an attacker to additionally emulate the spatial orientation of the signals correctly than is the case with just their amplitude, since he would have to correctly position several antennas in the vicinity of the motor vehicle 2 and vehicle key 4 for this purpose.

The invention claimed is:

1. A method for protection against a relay attack on a system composed of at least a first and a second communication device, wherein data are transmitted wirelessly between the first and the second communication device, wherein:
   the first communication device ascertains a first spectrum of all wirelessly transmitted signals to be received at the location of the first communication device within a frequency band, and
   the second communication device ascertains a second spectrum of all wirelessly transmitted signals to be received at the location of the second communication device within the frequency band;
   wherein the frequency band is limited by a minimum and a maximum frequency, wherein the second communication device transmits the second spectrum to the first communication device,
   wherein by means of the first communication device the first spectrum is compared with the second spectrum in order to determine whether the second communication device is located at the location of the first communication device, and
   wherein the first communication device emits additional wirelessly transmitted signals whose frequency is randomly chosen to the second communication device while the first and second spectrum are being ascertained to determine a frequency range that is receivable by the second communication device.

2. The method according to claim 1, wherein the first and the second spectrum are ascertained simultaneously or at respectively different times.

3. The method according to claim 1, wherein the first and the second spectrum are ascertained constantly or only at certain times.

4. The method according to claim 1, wherein the first communication device notifies the second communication device for which frequency a signal amplitude is to be ascertained.

5. The method according to claim 1, wherein the data transmission between the first and the second communication device is encrypted.

6. The method according to claim 1, wherein the first and the second communication device each have three antennas, wherein the three antennas are respectively arranged at an angle to each other.

7. The method according to claim 1, wherein a spatial angle between the first spectrum of all wirelessly transmitted signals and the second spectrum of all wirelessly transmitted signals is ascertained.

8. The method according to claim 1, wherein the first communication device is a motor vehicle and the second communication device is a vehicle key.

\* \* \* \* \*